(12) United States Patent
Islam et al.

(10) Patent No.: US 7,525,941 B2
(45) Date of Patent: Apr. 28, 2009

(54) METHODS AND APPARATUS FOR REDUCING POWER CONSUMPTION IN CDMA COMMUNICATION DEVICE

(75) Inventors: M. Khaledul Islam, Kanata (CA); C. Nicolas Bugnariu, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 866 days.

(21) Appl. No.: 10/737,511

(22) Filed: Dec. 16, 2003

(65) Prior Publication Data

US 2004/0213195 A1 Oct. 28, 2004

Related U.S. Application Data

(60) Provisional application No. 60/433,600, filed on Dec. 16, 2002.

(51) Int. Cl.
*H04B 7/216* (2006.01)
(52) U.S. Cl. ..................... 370/335; 370/342
(58) Field of Classification Search ............. 370/342, 370/352, 320, 335; 455/343, 422, 466, 352
See application file for complete search history.

(56) References Cited

U.S. PATENT DOCUMENTS

| | | | | |
|---|---|---|---|---|
| 5,465,392 A * | 11/1995 | Baptist et al. | ........... | 370/310 |
| 5,628,001 A | 5/1997 | Cepuran | | |
| 6,144,848 A * | 11/2000 | Walsh et al. | ........... | 455/419 |
| 6,229,988 B1 | 5/2001 | Stapefeld et al. | | |
| 6,275,712 B1 * | 8/2001 | Gray et al. | ........... | 455/522 |
| 6,289,464 B1 * | 9/2001 | Wecker et al. | ........... | 713/300 |
| 6,377,790 B1 * | 4/2002 | Ishii | ........... | 455/343.1 |
| 6,397,090 B1 * | 5/2002 | Cho | ........... | 455/574 |

(Continued)

FOREIGN PATENT DOCUMENTS

EP    1139613  A1    4/2001

(Continued)

OTHER PUBLICATIONS

"PCT Search Report and Written Opinion for Application # PCT/CA 03/00419, Mar. 24, 2003".

(Continued)

*Primary Examiner*—Kwang B Yao
*Assistant Examiner*—Andrew Lai
(74) *Attorney, Agent, or Firm*—John J. Oskorep, Esq.

(57) ABSTRACT

Methods and apparatus for reducing power consumption of a code division multiple access (CDMA) communication device are described. The CDMA communication device operates in a communication session with a base station during which information is communicated over an information channel. At some point during the communication session, the device identifies that is has no information to transmit. In response, the device places its transmitter into a low power state and does not transmit any information that it would normally be accustomed to transmit (e.g. overhead such as idle frames) provided that forward RF link is stable. During that time, a receiver of the communication device may remain operative to receive information (e.g. transmitter power values). Provided that there is no need to transmit other necessary information, the transmitter is maintained in the low power state for a duration of time that is less than a fade time expiration of the base station. Thus, the communication device imitates a short fade during the communication session to conserve battery power.

40 Claims, 9 Drawing Sheets

U.S. PATENT DOCUMENTS

| | | | |
|---|---|---|---|
| 6,535,752 B1 * | 3/2003 | Dent | 455/574 |
| 6,600,926 B1 * | 7/2003 | Widell et al. | 455/446 |
| 6,697,415 B1 * | 2/2004 | Mahany | 375/130 |
| 2001/0014612 A1 * | 8/2001 | Uesugi | 455/522 |
| 2002/0183086 A1 * | 12/2002 | Hellmark et al. | 455/522 |
| 2003/0100314 A1 * | 5/2003 | Czaja et al. | 455/456 |
| 2003/0232621 A1 * | 12/2003 | Brooks | 455/424 |

FOREIGN PATENT DOCUMENTS

| | | | |
|---|---|---|---|
| EP | 1983780 A2 | 10/2008 | |
| WO | 9956405 A1 | 11/1999 | |
| WO | 0150637 A1 | 7/2001 | |
| WO | WO 02/33853 A1 | 4/2002 | |

OTHER PUBLICATIONS

Extended European Search Report - European Patent Application #08161208.7 - Dated: Feb. 12, 2009.

\* cited by examiner

METHODS AND APPARATUS FOR REDUCING POWER CONSUMPTION IN CDMA COMMUNICATION DEVICE

CROSS-REFERENCE TO RELATED APPLICATION

The present application claims priority to U.S. Provisional Application No. 60/433,600 filed on Dec. 16, 2002, the complete drawings and specification of which are incorporated herein by reference.

BACKGROUND

1. Technical Field

This application relates generally to Code Division Multiple Access (CDMA) communication techniques, and more particularly to methods and apparatus for reducing power consumption in a CDMA communication device which utilizes "bursty" communication techniques.

2. Description of the Related Art

Wideband Code Division Multiple Access (WCDMA), CDMA2000, and Interim Standard (IS) 95 are respectively third generation (3 G), two-and-a-half generation (2.5 G), and second generation (2 G) public land mobile telecommunication systems that use CDMA communication techniques. Various standardization bodies set and publish such standards for CDMA communication, each in their respective areas of competence. For instance, the Third Generation Partnership Project 2 (3GPP2) sets and publishes communication standards for CDMA2000. Within the scope of a particular standardization body, specific partners set and publish standards in their respective areas.

Known CDMA communication techniques require that a mobile station (MS) simultaneously transmit and receive signals over a traffic channel during a communication session with a base station (BS). Such requirements are undesirable from the standpoint of power consumption, especially for "bursty" communications where data or other signals may be communicated in a somewhat discontinuous and/or sporadic fashion. Minimizing power consumption is a relatively important objective for MSs, especially when they are battery-powered and equipped with a relatively small battery source.

When there is communication inactivity during a session (e.g. no data packets or voice signals to transmit), the MS is still required to transmit frames of lowest agreed upon rate to maintain the session. For a data session, if a predetermined amount of time (such as twenty seconds) elapses with no communication activity between the BS and the MS, the session may be terminated by the BS. In one particular technique, a CDMA MS is required to transmit RLP idle frames at the lowest rate when the MS has no RLP data or RLP control frames to send during an active packet data session. Similarly, the MS is required to send the lowest rate frames during a voice call when there is no voice, audio, or signalling activity. As apparent, the MS and the network may undesirably spend a significant percentage of the overall session in "overhead" or "maintenance" in the exchange of idle frames. In addition, if a MS and BS agree to use coherent communication on the reverse link, this may require that the MS send a pilot channel during a voice call or packet data session regardless of the rate of the traffic channel. The reverse pilot channel also includes fast forward power control channel which is used by the BS to adjust its transmit power. Since the power of the reverse pilot channel is relatively high in comparison to the lowest rate reverse traffic channel, the MS may consume a significant amount of power just by keeping its transmitter on when there is no data to send.

Accordingly, there is a resulting need for reducing power consumption in a CDMA communication device.

SUMMARY

Methods and apparatus for reducing power consumption in a code division multiple access (CDMA) communication device are described herein. The CDMA device may be a battery-powered mobile station (MS) or, alternatively, a base station (BS). The CDMA communication device is configured to wirelessly communicate based on an IS-95, an IS-2000, a CDMA2000, or other similar or related standard.

The CDMA device is configured to operate in a communication session (e.g. a data-packet or a voice call session) during which information is communicated over an information channel. Examples of such information include user data, signalling information from the MS such as a hand-off request message, and forward link power control information to adjust the power of the BS. At some time during this session, the device identifies that there is no information to transmit from its transmitter. In response, the device places its transmitter into a low power state during at least a portion of the session. Preferably, a modulator and a power amplifier (PA) of the transmitter are shut off in the low power state. Alternatively, for example, a power setting of the PA may be set to a zero or other negligible value in the low power state.

During the low power state, the device refrains from transmitting any information (e.g. including Radio Link Protocol (RLP) idle frames) which would otherwise normally be transmitted. However, the CDMA device may maintain operation of its receiver to receive information while the transmitter is in the low power state. In particular, during the low power state the CDMA device may monitor the variation of the BS power through its receiver and store transmitter power values which are based on these received values. The CDMA device may cause its transmitter to exit the low power state before an expiration of a fade timer, to thereby imitate a brief "fade" in the communication system.

The details of such methods and apparatus disclosed herein enable mobile stations to communicate with base stations using bursty CDMA techniques which do not require that the MS transmitter remain on throughout the exchange with the BS. It is a particular object of the present application that the methods and apparatus of "bursty" CDMA communication are provided at a MS to enable it to make intelligent decisions as to when it can turn off the transmitter to take advantage of data/voice inactivity in a stable RF environment, how long it can keep the transmitter off without dropping the communication session, and operating in such a manner so as to maintain compliance with the applicable CDMA standard.

Advantageously, the techniques of the present application can be adapted to co-operate with known CDMA standards by operating to simulate or imitate a MS "fade" as seen by the BS. In a typical CDMA-compliant embodiment, a BS which follows a CDMA standard will typically assume that the MS has faded if the BS has not received any valid data from MS. If fading lasts for more than a predetermined amount of time, such as five (5) seconds, the BS will terminate the session (e.g. release the call) in response to such time expiration. If the MS intentionally decides not to transmit during certain intervals (i.e. it does not transmit otherwise required RLP idle frames) but still meets the fade timeout criteria, these intervals will appear to the BS as if the MS is merely undergoing a fade where all rake fingers of the BS's CDMA receiver are out of lock. In such conditions, a typical BS implementation does not increase its transmit power but begins sending alternate UP-DOWN (or a fixed pattern) commands every forward link frame to the MS for reverse link transmit power. Advantageously, this embodiment merely requires that lower layers of the CDMA protocol stack be modified to reap the benefits of lower power consumption.

In a particular embodiment, which is implemented in a MS physical layer of the CDMA protocol stack, three (3) major states are associated with controlling the power amplifier of the transmitter: PA_ON_SLOW, PA_OFF, and PA_ON_REGULAR. The transmitter is switched to and remains in the PA_ON_REGULAR state when data is being sent. However, the transmitter is switched to the PA_ON_SLOW state in a stable radio environment when the MS starts sending RLP idle frames during data inactivity, or lowest rate frames during voice call inactivity along with fast forward power control, if applicable. The term "stable radio environment" is used herein to indicate the condition when the MS decides that there is no need to adjust the forward link information channel power of the BS. In the PA_ON_SLOW state, the MS starts to transmit information and makes necessary preparation to enter the PA_OFF state where the power amplifier (PA) of the transmitter can be shut off. As soon as power control loop stability is reached, the transmitter is switched to the PA_OFF state.

Different techniques may be utilized in making this transition. In a first method, a timer is utilized, the expiration of which triggers the state transition. Alternatively, a second method takes advantage of a typical base station implementation which sends alternate UP-DOWN (or fixed pattern) commands during the time the MS is perceived to be undergoing a fade. If the BS supports this implementation, then the MS switches to the PA_OFF state when it detects on a consistent basis that the BS is no longer sending equal UP-DOWN (or fixed pattern) commands. This serves as an indication that the BS has reacquired the MS and started regular adjustment of reverse link power. Once this condition is detected, the MS waits for a small period of time that is required for stability. This second method is preferred over the first one, as it is adaptive and optimizes the duration of PA_ON_SLOW state.

In the PA_OFF state, the transmitter's PA is turned off; however, the receiver remains on. This effectively conserves power at the MS and at the same time conserves spectrum (i.e. there is less interference in the reverse link). To ensure backwards compatibility, in one embodiment the transmitter remains in the PA_OFF state for a certain period of time that satisfies the fading timeout criteria. Then, the state is changed back to the PA_ON_SLOW state. At any moment if there is any non-idle frame that needs to be sent out (such as new data or control frame, voice, signalling message, forward power control), the device automatically switches to the PA_ON_REGULAR state.

Other aspects and features of the present application will become apparent to those ordinarily skilled in the art upon review of the following description of specific embodiments.

BRIEF DESCRIPTION OF THE DRAWINGS

Embodiments of the present application will now be described, by way of example only, with reference to the attached figures wherein the same reference numerals in different figures are used to denote similar or the same elements.

DETAILED DESCRIPTION OF THE DRAWINGS

Figure 1:
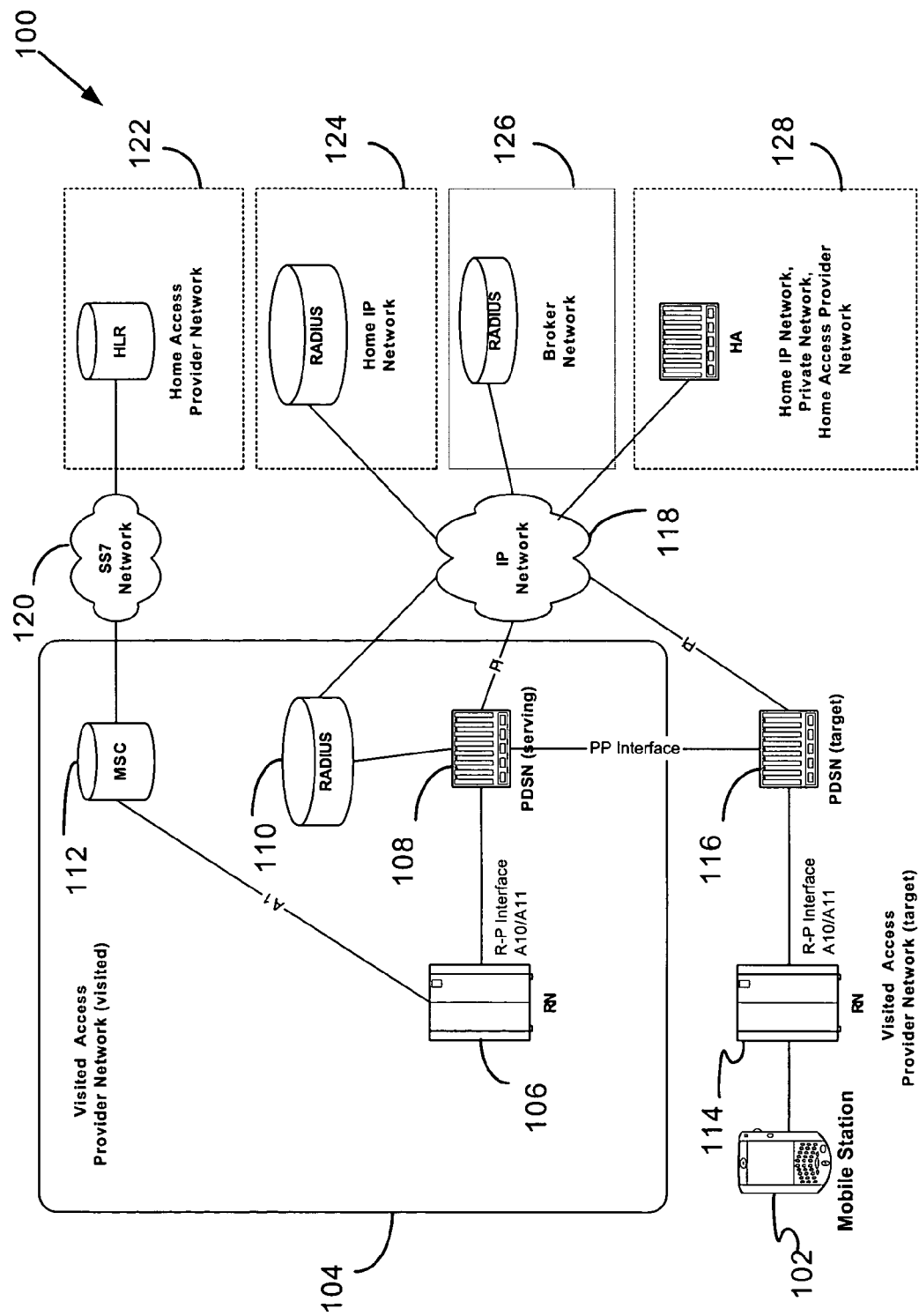
FIG. 1 is a block diagram illustrating one example of a Code Division Multiple Access (CDMA) network.

As described herein, a method of reducing power consumption in a code division multiple access (CDMA) communication device includes the acts of operating the device in a communication session during which information is communicated over an information channel; identifying that there is no information to transmit by the CDMA communication device; and during at least a portion of the communication session, causing a transmitter of the CDMA communication device to be maintained in a low power state based at least in part on the act of identifying. In the low power state, the transmitter does not transmit any information that it would normally be accustomed to transmit. The term "information" is used herein to broadly indicate all forms of data that the MS transmits, such as user data, signalling information such as a hand-off request message, forward link power control information to adjust the power of the BS, and Radio Link Protocol (RLP) idle frames, etc. The low power state is preferably maintained for a duration of time that is less than a fade timer expiration.

A CDMA communication device of the present application (which may be a mobile station or a base station) is configured to wirelessly communicate based on an IS-95, an IS-2000, a CDMA2000, or other similar or related standard. The CDMA device includes a receiver; a transmitter which includes a power amplifier (PA); an antenna coupled to the receiver and the transmitter; and a processor coupled to the receiver and the transmitter. The processor operates the CDMA communication device in a communication session during which information is communicated over an information channel, identifies that there is no information to transmit and, during at least a portion of the communication session, causes the transmitter to enter into a low power state based at least in part on no information being required to transmit over the information channel. Again, the transmitter does not transmit any information that it would normally be accustomed to transmit during this low power state. The low power state is preferably maintained for a duration of time that is less than a fade timer expiration.

A CDMA communication system of the present application includes a base station operative for CDMA communication and a portable electronic device operative for CDMA communication with the base station. The portable electronic device is configured to operate in a communication session during which information is communicated with the base station over an information channel, to identify during the communication session that there is no information to transmit to the base station; and to cause a transmitter of the portable electronic device to enter into a low power state based at least in part on no information being available to transmit. Again, the portable electronic device does not transmit any information that it would normally be accustomed to transmit during this low power state. The low power state is preferably maintained for a duration of time that is less than a fade timer expiration.

In other variations, a method of reducing power consumption in a battery-operated mobile station which operates in accordance with a code division multiple access (CDMA) technique includes the acts of operating in a communication session during which information is communicated with a serving base station over an information channel; based on identifying that there is no information to transmit, powering down a transmitter power amplifier (PA) during a portion of the communication session such that no signals are transmitted to the serving base station; and powering up the transmitter PA before an expiration of a fade timer of the serving base station. A battery-powered CDMA mobile station of the present application includes a CDMA receiver; a CDMA transmitter; a processor coupled to the CDMA receiver and the transmitter. The processor operates the CDMA receiver and transmitter in a communication session during which information is communicated over an information channel, shuts down a power amplifier (PA) of the CDMA transmitter during a portion of the communication session based on identifying that there is no information to transmit; and powers up the PA before an expiration of a fade timer of a serving base station. While the PA is shut down, the CDMA transmitter does not transmit any information that it would normally be accustomed to transmit.

Referring to the drawings, FIG. 1 is a block diagram illustrating one example of a Code Division Multiple Access (CDMA) network 100. A mobile station (MS) 102 is shown "visiting" an access provider network 104 outside of its home network. Access provider network 104 includes a radio network (RN) 106, a Packet Data Service Node (PDSN) 108, a Remote Authentication Dial-In User Service (RADIUS) server 110, and a Mobile Switching Center (MSC) 112. MS 102 is shown as associated with an RN 114 and PDSN 116 ("target" structure), which are similar in structure and functionality to RN 106 and PDSN 108, respectively ("serving" structure). The RN is the infrastructure for connecting wireless base stations (BSs) to MSs and onto data networks. Within an RN, multiple BSs are included (although not expressly shown). A PDSN, such as PDSN 108, is a wireless-aware router that acts as an interface to the Internet (e.g. through an IP network 118) and the RN to transport packets to and from MS 102. RADIUS server 110 is used for authentication, authorization, and accounting purposes. MSC 112 enables voice and other circuit-switched communications, such as Short Message Service (SMS), being communicative through an SS7 network 120. Other conventional components and connections shown are either part of the core network, visiting networks, or the home network. For example, MSC 112 is coupled to a Home Location Register (HLR) of a home access provider network 122; a RADIUS server of a home IP network 124 is coupled to IP network 118; a RADIUS server of a broker network 126 is coupled to IP network 118; and a home agent (HA) of a home IP network 128 (or other) is coupled to IP network 118.

Operationally, when MS 102 powers up, it sends a registration message to RN 114 which validates registration with an HLR and assigns MS 102 to a Visitor Location Register (VLR) (not shown) if necessary. An Internet-Protocol (IP)-connected MS 102 sends a request to RN 114 to setup a Point-to-Point Protocol (PPP) session in order to get either an IP address in a "simple" IP network, a Care-Of Address (COA) in a mobile IP network, or other equivalent IP-type address of another IP network. Once the radio link protocol is established between MS 102 and RN 114, RN 114 initiates an R-P interface between RN 114 and PDSN 116. MS 102 is authenticated by a serving PDSN 108 via RADIUS server 110 and subsequently assigned an IP address. PDSN 116 then provides MS 102 with connectivity to, as examples, the Internet, an intranet, or more generally an IP network.

Figure 2:
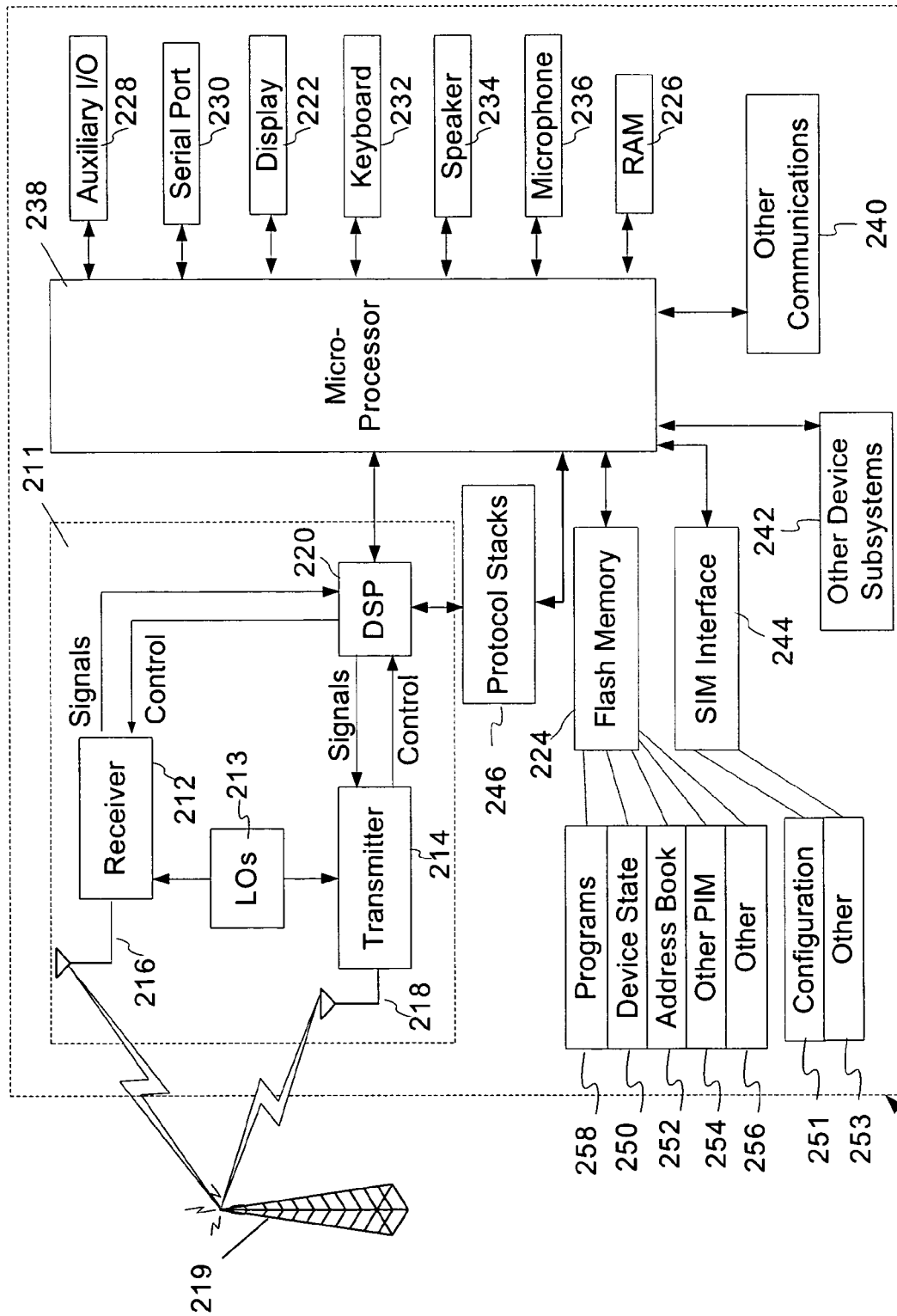
FIG. 2 is a block diagram illustrating a mobile station (MS) that can be configured to act as the MS of FIG. 1 and include preferred embodiments of the apparatus and method of the present application.

Turning now to FIG. 2, FIG. 2 is a block diagram illustrating a mobile station (MS) 200 that can be configured to both act as MS 102 of FIG. 1 and include preferred embodiments of the apparatus and method of the present application. MS 200 is preferably a two-way wireless communication device having at least voice and data communication capabilities. MS 200 preferably has the capability to communicate with other computer systems on the Internet. Depending on the exact functionality provided, this wireless device may be referred to as a data messaging device, a two-way pager, a wireless e-mail device, a cellular telephone with data messaging capabilities, a wireless Internet appliance, or a data communication device, as examples.

Where MS 200 is enabled for two-way communication through a communication network 219, it will incorporate a communication subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. As will be apparent to those skilled in the field of communications, the particular design of the communication subsystem 211 will be dependent upon the communication network in which the device is intended to operate. For example, MS 200 may include a communication subsystem 211 designed to operate within the Mobitex™ mobile communication system, the DataTAC™ mobile communication system, a General Packet Radio Service (GPRS) network, Universal Mobile Telecommunications System (UMTS) network, Enhanced Data rates for GSM Evolution (EDGE) network, or other CDMA network.

Network access requirements will also vary depending upon the type of network 219. In Mobitex and DataTAC networks, for example, MS 200 is registered on network 219 using a unique identification number associated with each MS. In UMTS and GPRS networks, however, network access is associated with a subscriber or user of MS 200. A GPRS MS therefore requires a subscriber identity module (SIM) card in order to operate on a GPRS network. Without a valid SIM card, a GPRS MS will not be fully functional. Local or non-network communication functions, as well as legally required functions (if any) such as "911" emergency calling, may be available, but MS 200 will be unable to carry out any other functions involving communications over the network 219. A SIM interface 244 is normally similar to a card-slot into which a SIM card can be inserted and ejected like a diskette or PCMCIA card. The SIM card may have approximately 64K of memory and hold many key configuration 251, and other information 253 such as identification, and subscriber related information.

When required network registration or activation procedures have been completed, MS 200 may send and receive communication signals over network 219. Signals received by antenna 216 through network 219 are input to receiver 212, which may perform such common receiver functions as signal amplification, frequency down conversion, filtering, channel selection and the like, and in the example system shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220 and input to transmitter 214 for digital-to-analog (D/A) conversion, frequency up conversion, filtering, amplification and transmission over network 219 via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

MS 200 preferably includes a microprocessor 238 which controls the overall operation of the device. Communication functions, including at least data and voice communications, are performed through communication subsystem 211. Microprocessor 238 also interacts with further device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated as 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list.

Operating system software used by the microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile memory such as RAM 226. Received communication signals may also be stored in RAM 226.

As shown, flash memory 224 can be segregated into different areas for both computer programs 258 and program data storage 250, 252, 254 and 256. These different storage types indicate that each program can allocate a portion of flash memory 224 for their own data storage requirements. Microprocessor 238, in addition to its operating system functions, preferably enables execution of software applications on the MS 200. A predetermined set of applications that control basic operations, including at least data and voice communication applications for example, will normally be installed on MS 200 during manufacturing. A preferred software application may be a personal information manager (PIM) application having the ability to organize and manage data items relating to the user of the MS 200 such as, but not limited to, e-mail, calendar events, voice mails, appointments, and task items. Naturally, one or more memory stores would be available on MS 200 to facilitate storage of PIM data items. Such PIM application would preferably have the ability to send and receive data items, via the wireless network 219. In a preferred embodiment, the PIM data items are seamlessly integrated, synchronized and updated, via network 219, with MS 200 user's corresponding data items stored or associated with a host computer system. Further applications may also be loaded onto MS 200 through network 219, auxiliary I/O subsystem 228, serial port 230, short-range communications subsystem 240, or other suitable subsystem 242, and installed by a user in RAM 226 or preferably a non-volatile store (not shown) for execution by microprocessor 238. Such flexibility in application installation increases the functionality of the device and may provide enhanced on-device functions, communication-related functions, or both. For example, secure communication applications may enable electronic commerce functions and other such financial transactions to be performed using MS 200.

In a data communication mode, a received signal such as a text message or web page download will be processed by the communication subsystem 211 and input to the microprocessor 238, which preferably further processes the received signal for output to display 222, or alternatively to auxiliary I/O device 228. A user of MS 200 may also compose data items such as email messages, for example, using keyboard 232, which is preferably a complete alphanumeric keyboard or telephone-type keypad, in conjunction with display 222 and possibly auxiliary I/O device 228. Such composed items may then be transmitted over a communication network through communication subsystem 211. For voice communications, overall operation of MS 200 is similar, except that received signals would preferably be output to speaker 234 and signals for transmission would be generated by microphone 236. Alternative voice or audio I/O subsystems, such as a voice message recording subsystem, may also be implemented on MS 200. Although voice or audio signal output is preferably accomplished primarily through speaker 234, display 222 may also be used to provide an indication of the identity of a calling party, the duration of a voice call, or other voice call related information, for example.

Serial port 230 in FIG. 2 would normally be implemented in a personal digital assistant (PDA)-type MS for which synchronization with a user's desktop computer (not shown) may be desirable, but is an optional device component. Such a port 230 would enable a user to set preferences through an external device or software application and would extend the capabilities of MS 200 by providing for information or software downloads to MS 200 other than through a wireless communication network. The alternate download path may for example be used to load an encryption key onto the device through a direct and thus reliable and trusted connection to thereby enable secure device communication. Other communications subsystems 240, such as a short-range communications subsystem, is a further optional component which may provide for communication between MS 200 and different systems or devices, which need not necessarily be similar devices. For example, subsystem 240 may include an infrared device and associated circuits and components or a Bluetooth™ communication module to provide for communication with similarly enabled systems and devices.

When MS 200 is used as MS 120 of FIG. 1, protocol stacks 246 and transceiver 211 cooperate to perform more specific techniques of the present application. Protocol stacks 246 are shown connected to both microprocessor 238 and DSP 220 of transceiver 211, so that the higher layer protocols can be handled by microprocessor 238 whereas the lower layers protocols can be handled by DSP 220. One protocol stack which can be included in block 246 is described below in FIG. 3. Furthermore, the method of FIG. 4 can be carried out by DSP 220 and/or microprocessor 238.

Figure 3:
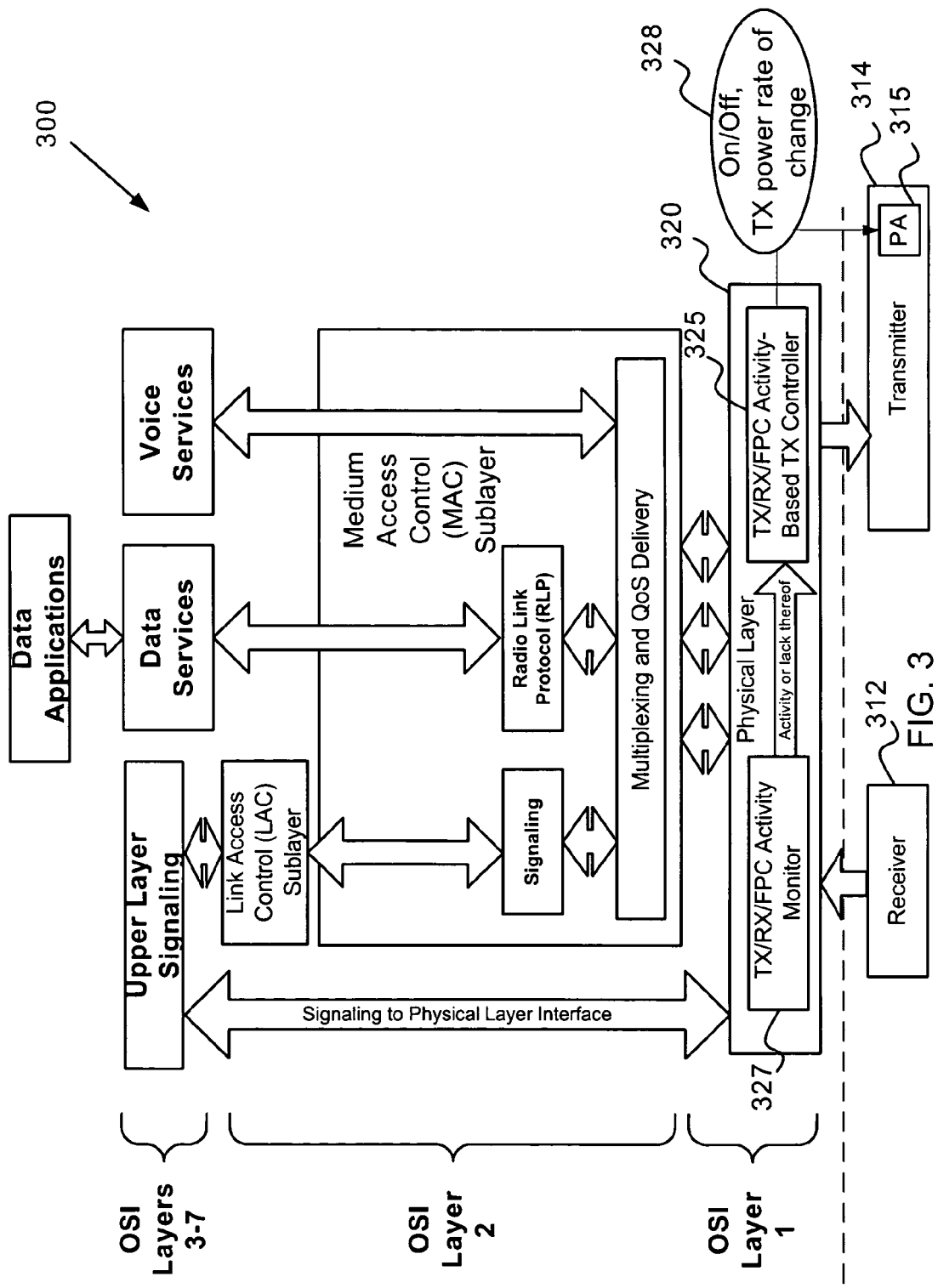
FIG. 3 is a block diagram illustrating a protocol stack having a preferred embodiment which employs techniques of the present application.

FIG. 3 is a block diagram illustrating a protocol stack 300 in a preferred embodiment of the present application. Protocol stack 300 of FIG. 3 is illustrated as having an apparatus in a physical layer 320 for monitoring physical layer activity with use of a transmit/receive/forward power control (TX/RX/FPC) activity monitor 327. TX/RX/FPC activity monitor 327 is operative to detect activity (or lack thereof) at physical layer 320 and, based on that activity (or lack thereof), controlling a transmitter 314 using a TX/RX activity-based TX controller 325. TX/RX activity (or lack thereof) can be caused by the higher layers, illustrated by Open Systems Interconnection (OSI) Layers 2-7, or could be caused by transmitter 314 and receiver 316 below OSI Layer 1 (i.e. physical layer 320). In addition, TX/RX/FPC activity monitor 327 detects the change in forward link radio conditions and decides when an adjustment is necessary. This can be done via monitoring different metrics associated with the forward link quality. Examples of such metrics include total received power, forward link information channel power, frame error rate, forward power control decisions that would have been sent if the transmitter was on, etc. Other components of FIG. 3 are well known.

TX/RX/FPC activity-based TX controller 325 is coupled to TX/RX/FPC activity monitor 327 so that, when the latter detects activity (or lack thereof) the former can control transmitter 314 based on the activity (or lack thereof). Of particular interest is its control of a power amplifier (PA) 315 of transmitter 314, which may involve ON/OFF control thereof (i.e. whether PA 315 amplifies and emits a radio signal or not) and/or control over the transmit power rate of change (i.e. how quickly PA 315 responds to power control commands, such as UP/DOWN commands, issued by the BS). Thus, it is possible to selectively control transmitter 314 so that, during periods if inactivity, transmitter 314 can be turned off. For example, transmitter 314 may be turned off during data inactivity in a data packet session in a stable radio environment when Radio Link Protocol (RLP) idle frames and/or fast forward power control would otherwise be normally sent. As another example, transmitter 314 may be turned off during a silent period in a voice call in a stable radio environment when lowest rate frames would otherwise normally be sent. When activity is identified, transmitter 314 is turned back on. It is preferred to operate the apparatus of FIG. 3 in such a manner that it co-operates with existing BSs, particularly by controlling transmitter 314 in a way which simulates or imitates fading, as will be further described further in reference to FIG. 4.

By turning off transmitter 314, it is placed into a low power state. Alternatively, programmable circuits in transmitter 314 may be disabled, or set to zero or other negligible value to maintain a low power state. In the low power state, all or only portions of transmitter 314 may be disabled or shut down.

Figure 4:
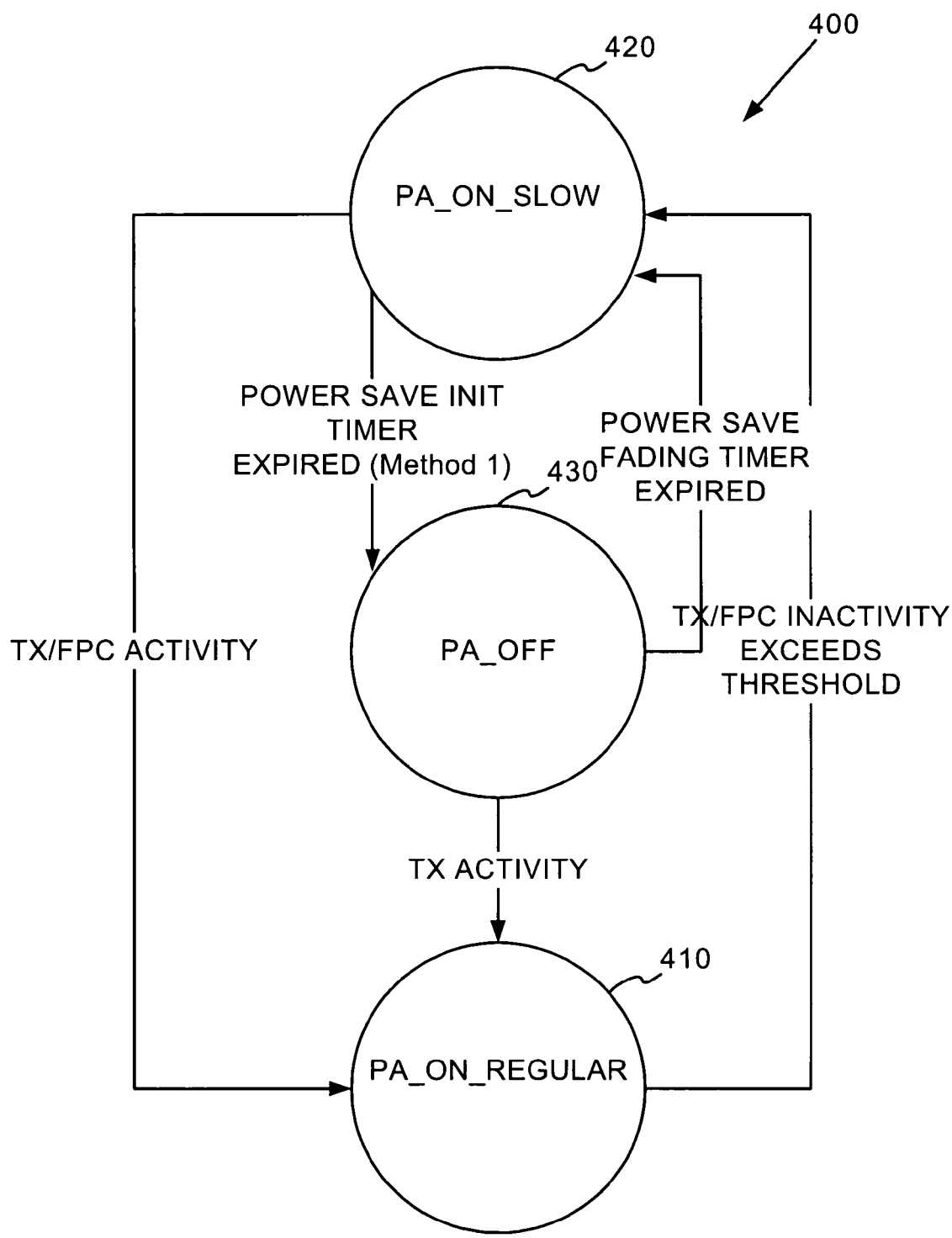
FIG. 4 is a state diagram illustrating a preferred embodiment which can co-operate with the apparatus of FIG. 3.

FIG. 4 is a state diagram illustrating the preferred embodiment of the present communication method which may cooperate with the apparatus of FIG. 3. In FIG. 4, a state machine 400 having three main states is shown: a PA_ON_SLOW state 420, a PA_OFF state 430, and a PA_ON_REGULAR state 410. The names of the states are a juxtaposition of the ON/OFF state of the PA (PA_ON and PA_OFF) and the rate of change of the transmit power in response to power control commands from the BS (REGULAR and SLOW).

In PA_ON_REGULAR 410 state, the PA is maintained powered ON as is conventional and the step size of the correction factor for the MS transmit power is changed at a regular rate (e.g. using a step size which corresponds to what is requested by the BS, such as a 1 dB step size). In state 410, the MS transmitter power value is given by: TX=(RX+constant+regular correction). Also, in state 410 the transmitter functions as a conventional transmitter until a transmit inactivity threshold is exceed, upon the occurrence of which the state changes to PA_ON_SLOW 420 state. An exemplary inactivity threshold is that of receiving a single RLP idle frame. If the MS sends any signalling message, then it keeps the transmitter ON for a certain period of time. This is necessary for a variety of reasons, such as for a handoff scenario. In case of a handoff, the handoff request needs to be granted by the BS and the handoff process needs to be completed, which requires that the MS is acquired by the target BS.

In PA_ON_SLOW state 420, the PA is maintained powered ON as was the case in the PA_ON_REGULAR state 410. However, the step size of the correction factor for the MS transmit power is changed at a slower rate (i.e. using a step size which is a scaled down value of what is requested by the BS; for example, using a quarter scale results in a 0.25 dB step size). In state 420, the MS transmitter power value is given by the expression TX=(RX+constant+slow correction). Upon entering state 420, a "power save init timer" is started (assuming method 1 is used) which has, for example, a 200 millisecond (msec) time duration. While in state 420, the transmitter functions as a conventional transmitter until one of two events: until the power save init timer has expired whereupon the state changes to PA_OFF state 430 (described below); or until there is requirement for transmit activity (e.g. due user data, signalling, or need to send forward power control (FPC) information) whereupon the state changes to PA_ON_REGULAR state 410 (described above).

In PA_OFF state 430, the PA and/or other transmitter components are maintained powered OFF. However, the MS transmitter power value may be updated based on the received BS power values, resulting in an open loop tracking. Such power values are stored in memory as is conventional. In state 430, the MS transmitter power value is given by the expression TX=(RX+constant). Upon entering state 430, a "power save fading timer" is started which has, for example, a duration which is a fraction of the fade timeout of the BS, for instance ½ of 5 seconds or 2½ seconds. While in state 430, the transmitter does not function as a conventional transmitter in that the PA is turned off, to thereby simulate or imitate a fade of the MS as seen by the BS. The modulator and/or other portions of the transmitter may be powered down or disabled as well. State 430 is maintained until either: until the power save fading timer has expired whereupon the state changes to the above-described PA_ON_SLOW state 420; or until there is requirement for transmitter activity whereupon the state changes to the above-described PA_ON_REGULAR state 410.

An alternate technique may be used to transition from PA_ON_SLOW state 420 to PA_OFF state 430. This technique takes advantage of a typical BS implementation which sends alternate UP-DOWN (or a fixed pattern) commands during the time the MS is perceived to be undergoing the fade. If the BS supports this implementation, the MS switches to PA_OFF state 430 when it detects on a consistent basis that the BS no longer sends equal UP-DOWN (or a fixed pattern) commands. This serves as an indication that the BS has reacquired the MS and has started regular adjustment of the reverse link power. Once this condition is detected, the MS waits for a small period of time that is required for stability before entering PA_OFF state 420.

In an alternate embodiment, only PA_ON_REGULAR and PA_OFF states 410 and 430 are utilized and PA_ON_SLOW state 420 is optional. In another alternative embodiment, the MS determines if the BS is enabled to receive bursty CDMA communication from a MS and, if so determined, the MS need not simulate fading so as to render PA_ON_SLOW state 420 unnecessary. In yet another alternative embodiment, the MS optionally disables or enables steps of the technique by configuration operation, allowing a MS that is capable of bursty CDMA communication to be also enabled for traditional CDMA communication.

Figure 5:
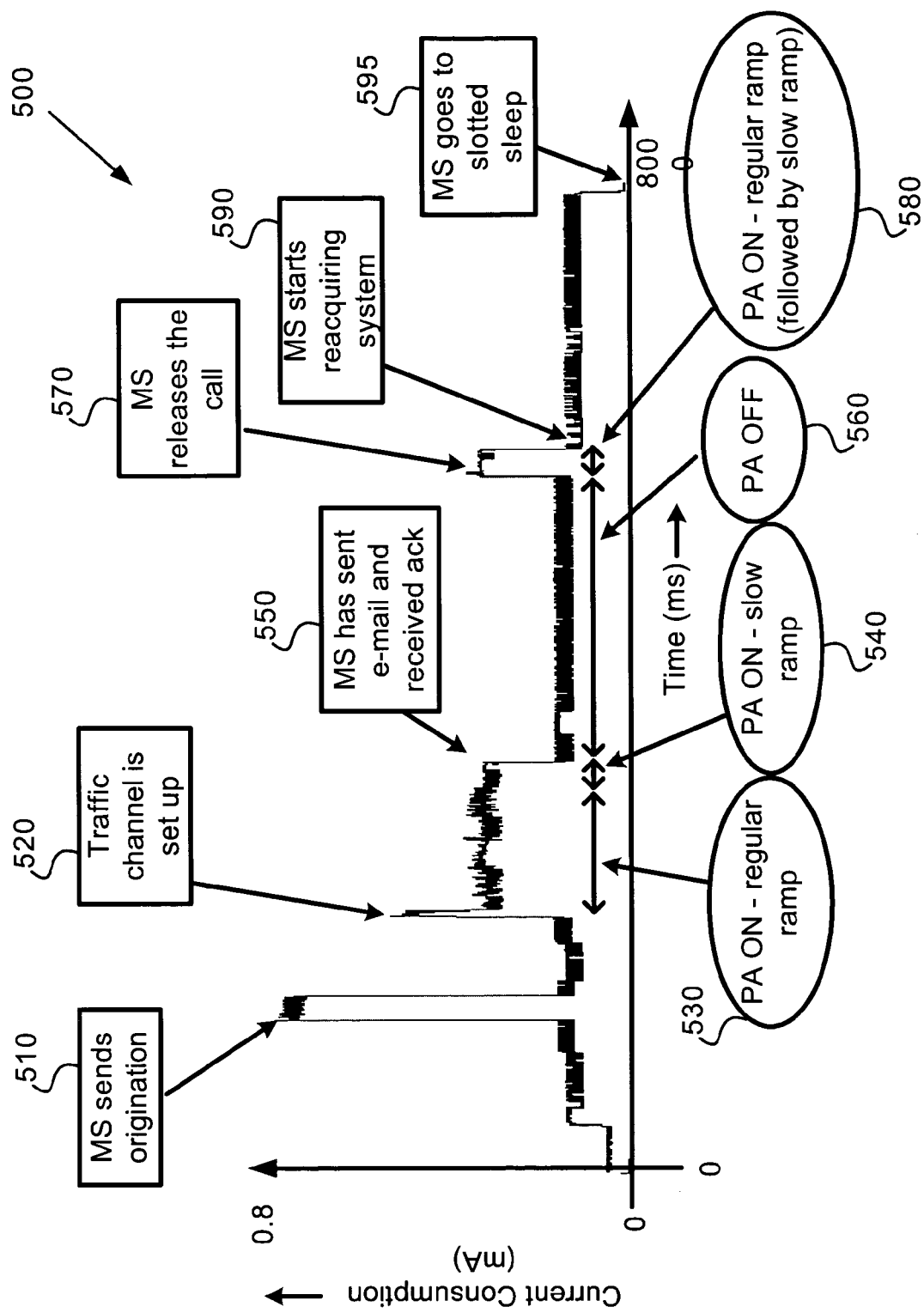
FIG. 5 is a graph illustrating a current consumption in an MS during an MS-initiated communication session in which techniques of the present application are enabled.

FIG. 5 is a graph 500 illustrating current consumption at an MS during an MS-initiated communication session in which techniques of the present application have been enabled. The MS sends a request to set up a data session (event 510). After negotiation between the MS and the BS, a traffic channel is set up (event 520). During this time, the device is in the PA_ON_REGULAR state since it is has information to send (event 530). After radio link protocol is established, data is sent from the MS and acknowledgment is received (event 550). Data inactivity then occurs, which in turn forces a transition to the PA_ON_SLOW state (event 540). After transmission of a number of idle frames, the PA is turned OFF (event 560) since there is no TX/FPC activity. Here, the receiver is still ON so that the MS can track the open loop transmit power that would be required when it turns the transmitter PA on again. When the inactivity timer expires (assuming method 1 is used), the MS sends an indication to the BS that it desires to enter a dormant state (event 570). This results in signalling activity, which in turn forces a transition to the PA_ON_REGULAR state (event 580). Once the message transmission is over, the MS re-enters the PA_ON_SLOW state and eventually turns off the PA when it gets acknowledgment from the network that the call can be released. The MS starts reacquiring the system (event 590) to make sure that it has most recent network configuration data after the call is over and then goes into slotted sleep mode (event 595).

Figure 6:
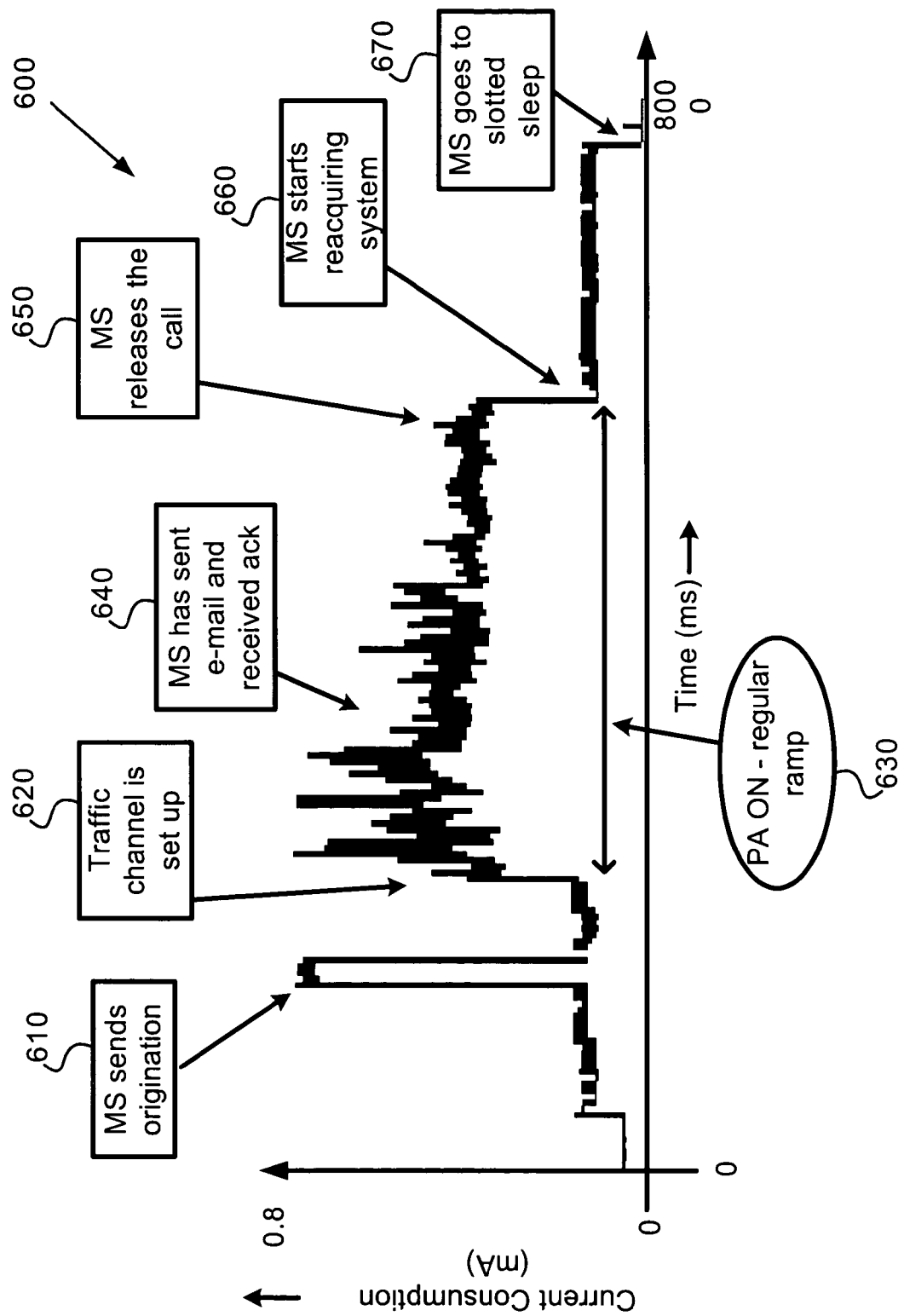
FIG. 6 is a graph illustrating exemplary current consumption in an MS during an MS-initiated data call in which techniques of the present application have been optionally disabled.

FIG. 6 is a graph 600 illustrating exemplary current consumption at an MS during an MS-initiated communication session in which the techniques of the present application have been optionally disabled. The MS sends a request to set up a data session (event 610). After negotiation between the MS and the BS, a traffic channel is set up (event 620). The transmit PA is ON with the ramp controlled by the BS based on radio frequency (RF) conditions (event 630). After radio link protocol is established, data is sent from the MS and acknowledgment is received (event 640). The MS and BS start exchanging Radio Link Protocol (RLP) idle frames during the period of data inactivity. When the inactivity timer expires, the MS releases the data call to enter dormant state (event 650). The MS stops the PA when it gets acknowledgment from the network that the call can be released. The MS starts reacquiring the system (event 660) to make sure that it has most recent network configuration data after the call is over and goes to slotted sleep (event 670).

Figure 7:
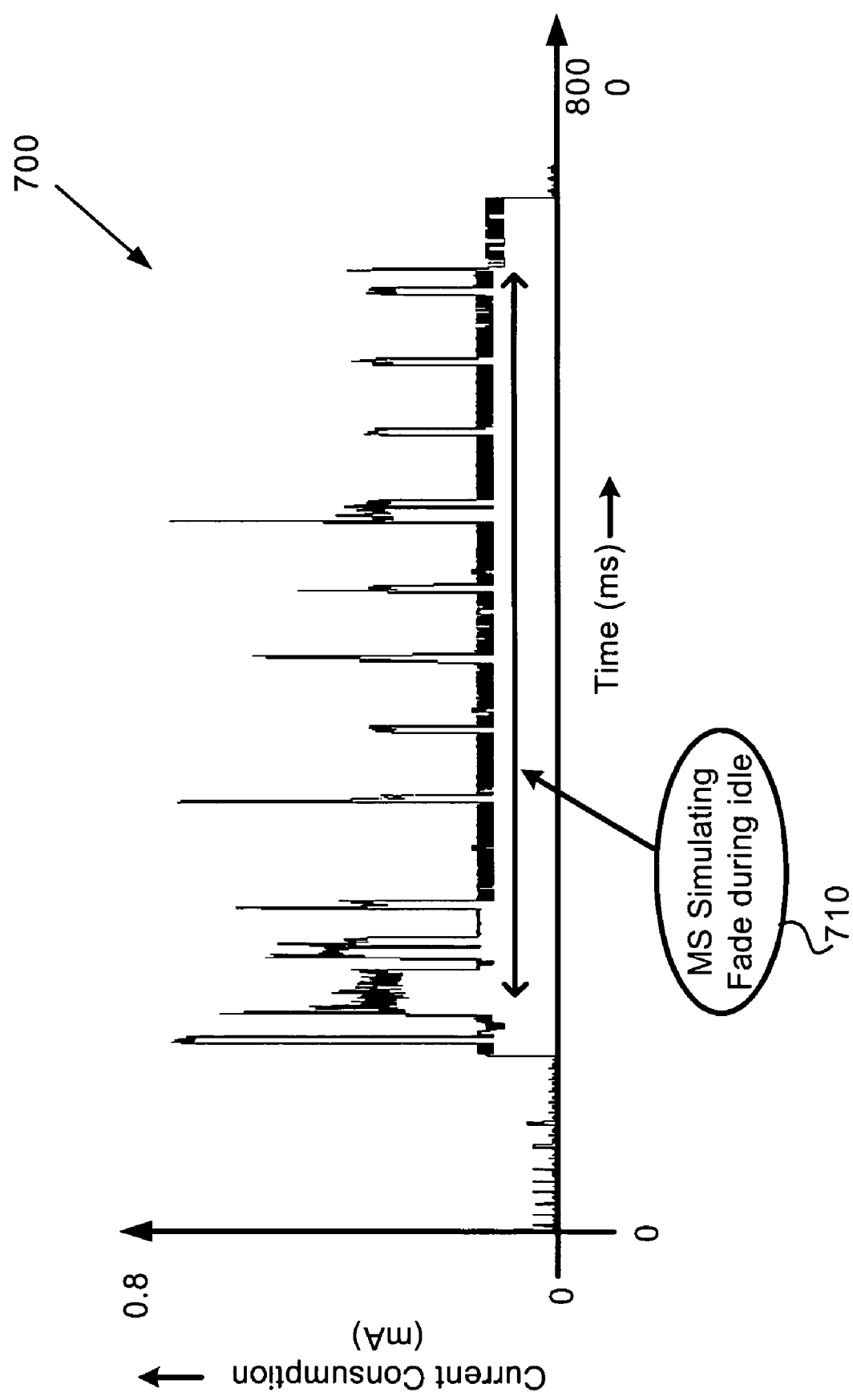
FIG. 7 is a graph illustrating exemplary current consumption at an MS during a BS-initiated data call in which techniques of the present application are enabled.

FIG. 7 is a graph 700 illustrating exemplary current consumption at an MS during a BS-initiated communication session in which techniques of the present application have been enabled. Once the MS has received data and has sent acknowledgement, data inactivity begins. Since the forward link RF is stable, the MS makes use of it by turning the PA OFF to simulate a temporary fade (event 710). The receiver is still ON so that the MS can track the open loop transmit power that would be required whenever it turns the transmit PA ON again. When the power save fade timer expires (assuming method 1 is used), the MS enters the PA_ON_SLOW state and resumes transmission using the open loop value with slow ramp. Since there is still no required transmit activity, the MS transitions back to PA OFF state after some time. Transitions between the PA_OFF and the PA_ON_SLOW states continue until the call is released by the BS. The MS goes to the PA_ON_REGULAR state to acknowledge the release order and enters slotted sleep mode after reacquiring the system.

Figure 8:
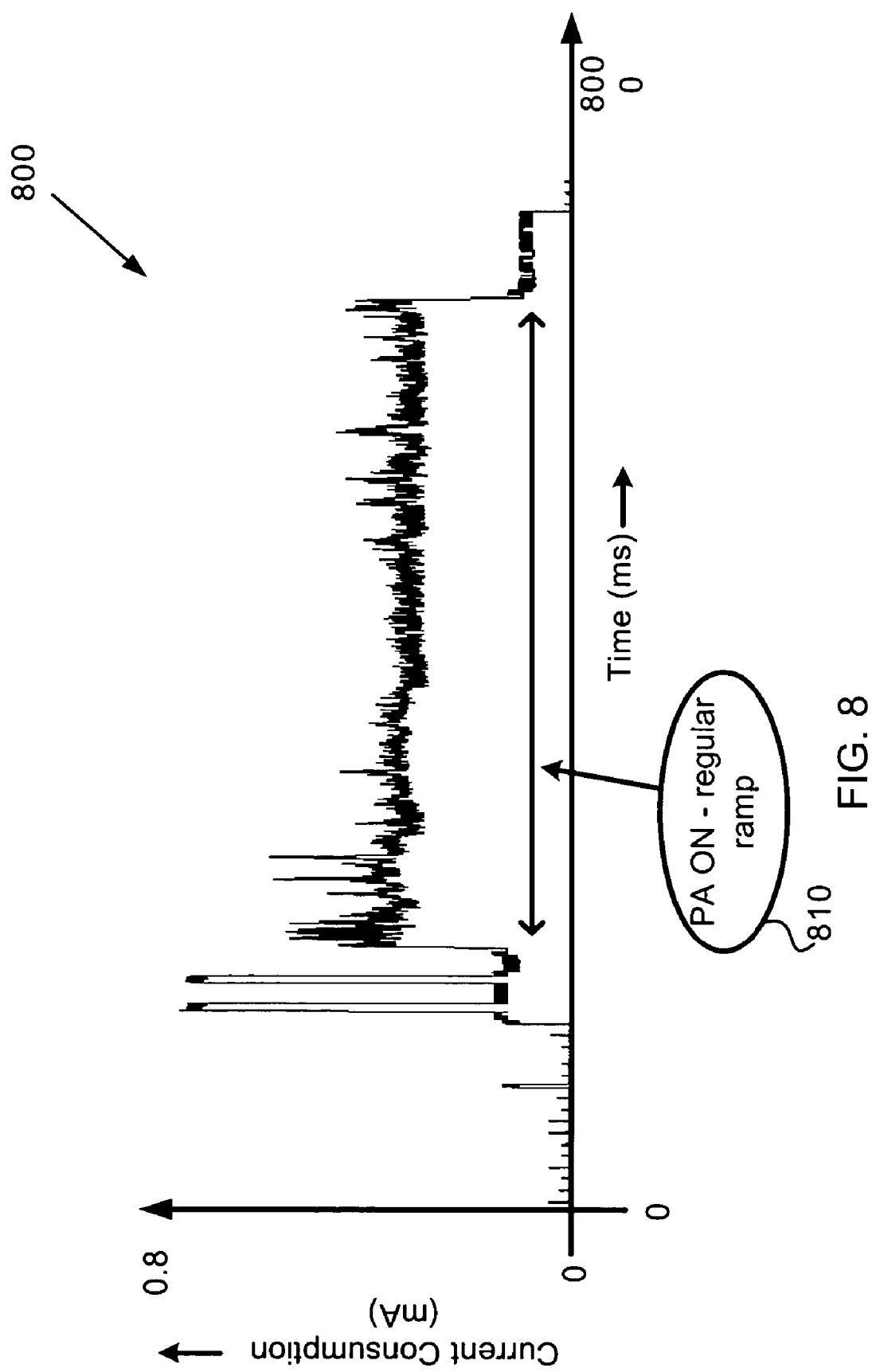
FIG. 8 is a graph illustrating exemplary current consumption at an MS during a BS-initiated data call in which techniques of the present application have been optionally disabled.

FIG. 8 is a graph 800 illustrating exemplary current consumption at an MS during a BS-initiated data call in which techniques of the present application have been optionally disabled. Once the MS has received data and sent acknowledgements, data inactivity begins. The MS and the BS start exchanging RLP idle frames. The transmit PA is ON throughout the duration with ramp controlled by the BS based on the RF conditions (event 810). The MS acknowledges the release order when the BS terminates the call and enters slotted sleep mode after reacquiring the system.

Figure 9:
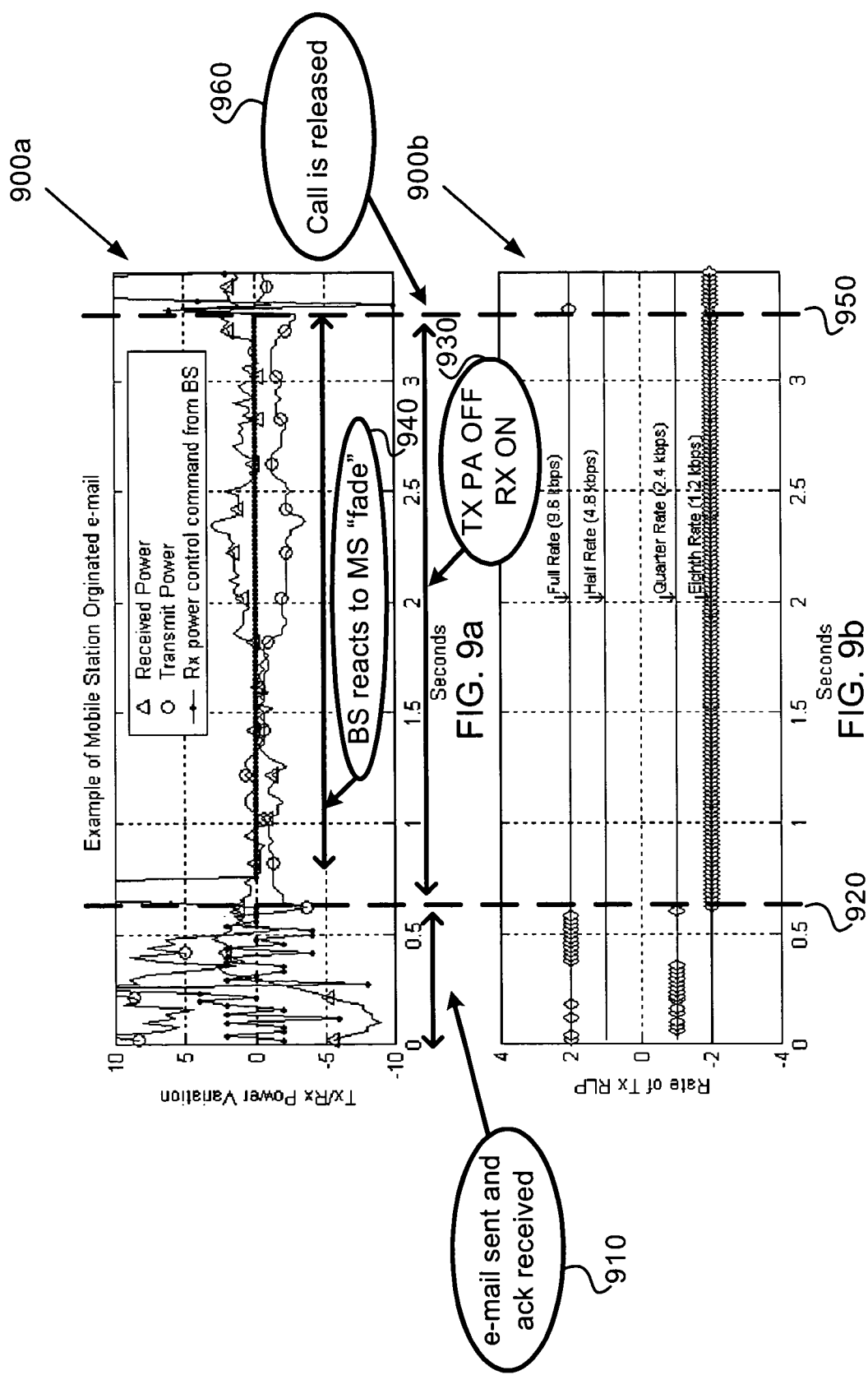
FIGS. 9A and 9B are graphs illustrating exemplary power variation and rate variation of the TX Radio Link Protocol (RLP) at a MS during an MS-initiated data call in which techniques of the present application have been enabled.

FIG. 9 is a graph 900 illustrating exemplary power variation and rate variation of the TX RLP at an MS during an MS-initiated communication session in which techniques of the present application have been enabled. Similar to event 500 of FIG. 5, the MS has received an acknowledgement that the data was received (event 910). Data inactivity commences shortly after that (event 920). As a result, the MS transitions to the PA_OFF state with its receiver still ON (event 930). As soon as the MS stops transmitting, the BS initially responds by asking the MS to increase its power. Once the BS realizes that its receiver has lost track of the MS, it assumes that the MS is undergoing a "fade" and starts sending alternate UP/DOWN commands (event 940). This means that, if the MS were to listen to BS's command, the transmit power over one frame would have been unchanged. The MS internally maintains the would-be open loop transmit power based on received power during the PA_OFF state. When the inactivity timer expires (event 950), the MS enters the regular PA_ON mode and releases the call (event 960). If the BS requires a periodic report of the forward link quality metrics, the MS still sends this information whenever it is time to send it. This can serve as an indication to the BS of the quality of the forward link as measured by the MS.

Thus, methods of reducing power consumption in a code division multiple access (CDMA) communication device have been described. One method includes the acts of operating the device in a communication session during which information is communicated over an information channel; identifying that there is no information to transmit by the CDMA communication device; and during at least a portion of the communication session, causing a transmitter of the CDMA communication device to be maintained in a low power state based at least in part on the act of identifying. In the low power state, the transmitter does not transmit any information (including idle frames) that it would normally be accustomed to transmit. The low power state is maintained for a duration of time that is less than a fade timer expiration. If there any requirement for transmission of information prior to this expiration, the state is terminated early and the MS enters a normal transmit mode.

A CDMA communication device of the present application (which may be a mobile station or a base station) includes a receiver; a transmitter which includes a power amplifier (PA); an antenna coupled to the receiver and the transmitter; and a processor coupled to the receiver and the transmitter. The processor operates the CDMA communication device in a communication session during which information is communicated over an information channel, identifies that there is no information to transmit and, during at least a portion of the communication session, causes the transmitter to enter into a low power state based at least in part on no information being available to transmit over the information channel. Again, the transmitter does not transmit any information that it would normally be accustomed to transmit during this low power state. The low power state is preferably maintained for a duration of time that is less than a fade timer expiration.

A CDMA communication system of the present application includes a base station operative for CDMA communication and a portable electronic device operative for CDMA communication with the base station. The portable electronic device is configured to operate in a communication session during which information is communicated with the base station over an information channel, to identify during the communication session that there is no information to transmit to the base station; and to cause a transmitter of the portable electronic device to enter into a low power state based at least in part on no information being available to transmit. Again, the portable electronic device does not transmit any information that it would normally be accustomed to transmit during this low power state. The low power state is preferably maintained for a duration of time that is less than a fade timer expiration.

In other variations, a method of reducing power consumption in a battery-operated mobile station which operates in accordance with a code division multiple access (CDMA) technique includes the acts of operating in a communication session during which information is communicated with a serving base station over an information channel; based on identifying that there is no information to transmit, powering down a transmitter power amplifier (PA) during a portion of the communication session such that no signals are transmitted to the serving base station; and powering up the transmitter PA before an expiration of a fade timer of the serving base station. A battery-powered CDMA mobile station of the present application includes a CDMA receiver; a CDMA transmitter; a processor coupled to the CDMA receiver and the transmitter. The processor operates the CDMA receiver and transmitter in a communication session during which information is communicated over an information channel, shuts down a power amplifier (PA) of the CDMA transmitter during a portion of the communication session based on identifying that there is no information to transmit; and powers up the PA before an expiration of a fade timer of a serving base station. While the PA is shut down, the CDMA transmitter does not transmit any information that it would normally be accustomed to transmit.

The above-described embodiments of the present application are intended to be examples only. Those of skill in the art may effect alterations, modifications and variations to the particular embodiments without departing from the scope of the application.

We claim:

1. A method for use in reducing power consumption in a code division multiple access (CDMA) communication device having a transmitter which includes a power amplifier (PA), the method comprising the acts of:
   maintaining the CDMA communication device in a voice or a data call during which information is communicated over forward and reverse traffic channels set up with a base station;
   in response to identifying that there is no information to transmit by the CDMA communication device: during at least one portion of the voice or the data call, causing the transmitter to enter and be maintained in a low power state during which the PA is shut off while at least the reverse traffic channel is maintained by the base station; and
   causing the transmitter to be exited from the low power state during the voice or the data call so that the PA is turned on again for resuming communications for the voice or the data call.

2. The method of claim 1, wherein the act of maintaining the CDMA communication device in the voice or the data call comprises the further act of maintaining the CDMA communication device in a voice call.

3. The method of claim 1, wherein the act of maintaining the CDMA communication device in the voice or the data call comprises the further act of maintaining the CDMA communication device in a data call.

4. The method of claim 1, wherein a power setting of the PA is set to a zero or negligible value in the low power state.

5. The method of claim 1, further comprising:
   maintaining a receiver of the CDMA communication device enabled to receive information during the voice or the data call while the transmitter is in the low power state.

6. The method of claim 1, further comprising:
   during the low power state:
      maintaining a receiver of the CDMA communication device enabled to receive information during the voice or the data call while the transmitter is in the low power state;
      receiving, during the voice or data call, one or more power values through the receiver for tracking an open loop transmit power required when transmission for the voice or the data call is resumed; and
      storing one or more transmitter power values which are based on the received power values.

7. The method of claim 1, further comprising:
   refraining from transmitting any information in the low power state during the portion of the voice or the data call.

8. The method of claim 1, further comprising:
   refraining from transmitting idle frames in the low power state during the portion of the voice or the data call.

9. The method of claim 1, further comprising:
   during the low power state of the voice or the data call:
      maintaining a receiver of the CDMA communication device enabled to receive information during the voice or the data call while the transmitter is in the low power state;
      receiving one or more power values through the receiver for tracking an open loop transmit power required when transmission for the voice or the data call is resumed;
      storing one or more transmitter power values which are based on the received power values; and
      during the voice or the data call gradually causing the transmitter to reach a transmitter power value after exiting the low power state.

10. The method of claim 1, wherein the act of identifying that there is no information to transmit comprises identifying that there is no voice or user data for the voice or the data call to transmit.

11. The method of claim 1, further comprising:
   setting and running, in the CDMA communication device, a timer corresponding to a fade timer of the base station; and
   wherein the act of causing the transmitter to be exited from the low power state is performed in response to detecting an expiration of the timer prior to release of the voice or the data call by the base station.

12. The method of claim 1, wherein the CDMA communication device operates based on an IS-95, an IS-2000, or a CDMA2000 standard.

13. The method of claim 1, further comprising:
setting and running, in the CDMA communication device, a timer corresponding to a fade timer of the base station; and
wherein the act of causing the transmitter to be exited from the low power state is performed in response to identifying transmit activity by the CDMA communication device or detecting an expiration of the timer prior to release of the voice or the data call by the base station.

14. The method of claim 1, wherein the act of causing the transmitter to be exited from the low power state is performed in response to identifying transmit activity for the voice or the data call.

15. A code division multiple access (CDMA) communication device, comprising:
a receiver;
a transmitter which includes a power amplifier (PA);
an antenna coupled to the receiver and the transmitter;
a processor coupled to the receiver and the transmitter;
the processor being operative to:
maintain the CDMA communication device in a voice or a data call during which information is communicated over forward and reverse traffic channels set up with a base station;
in response to identifying that there is no information to transmit from the transmitter: during at least one portion of the voice or the data call, cause the transmitter to enter and be maintained in a low power state during which the PA is shut down while at least the reverse traffic channel is maintained by the base station; and
cause the transmitter to be exited from the low power state during the voice or the data call so that the PA is turned on again for resuming communications for the voice or the data call.

16. The CDMA communication device of claim 15, wherein the processor is operative to maintain the CDMA communication device in the voice or the data call by maintaining the CDMA communication device in a voice call.

17. The CDMA communication device of claim 15, wherein the receiver is enabled by the processor to receive information for the voice or the data call while the transmitter is in the low power state.

18. The CDMA communication device of claim 15, wherein the processor is further operative to identify that there is no information to transmit by identifying that there is no voice or user data to transmit from the transmitter, and further operative to refrain from transmitting idle frames during the portion of the voice or the data call.

19. The CDMA communication device of claim 15, wherein the processor further operates to set and run a timer corresponding to a fade timer of the base station, and cause the transmitter to exit the low power state in response to detecting an expiration of the timer prior to release of the voice or the data call by the base station.

20. The CDMA communication device of claim 15, wherein the device refrains from transmitting idle frames in the low power state during the portion of the voice or the data call.

21. The CDMA communication device of claim 15, wherein the processor is further operative to:
during the low power state of the voice or the data call:
receive one or more power values through a receiver of the CDMA communication device for tracking an open loop transmit power required when transmission for the voice or the data call is resumed;
store one or more transmitter power values which are based on the received power values; and
gradually cause the transmitter to reach a transmitter power value during the voice or the data call after exiting the low power state.

22. The CDMA communication device of claim 15, wherein the processor is further operative to identify that there is no information to transmit by identifying that there is no voice or user data to transmit and no signalling data to transmit.

23. The CDMA communication device of claim 15, wherein the processor is further operative to cause the transmitter to be exited from the low power state in response to identifying transmit activity for the voice or the data call at the CDMA communication device.

24. A code division multiple access (CDMA) communication system, comprising:
a base station operative for CDMA communication;
a portable electronic device operative for CDMA communication with the base station;
the portable electronic device being further operative to maintain a voice or a data call during which information is communicated over forward and reverse traffic channels set up with the base station;
the portable electronic device being further operative to identify, during the voice or the data call, that there is no information to transmit from the portable electronic device to the base station;
the portable electronic device being further operative to cause a transmitter of the portable electronic device to enter and be maintained in a low power state during which a power amplifier (PA) of the transmitter is shut off for at least a portion of the voice or the data call, while at least the reverse traffic channel is maintained by the base station, based at least in part on identifying that there is no information to transmit from the portable electronic device; and
the portable electronic device being further operative to cause the transmitter to be exited from the low power state during the voice or the data call so that the PA is turned on again for resuming communications for the voice or the data call.

25. The CDMA communication system of claim 24 which operates in accordance with an IS-95, IS-2000, or CDMA2000 standard.

26. The CDMA communication system of claim 24, wherein the portable electronic device is further operative to maintain the CDMA communication in the voice or the data call by maintaining the CDMA communication device in a voice call.

27. The CDMA communication system of claim 24, wherein the portable electronic device is further operative to refrain from transmitting idle frames in the low power state.

28. The CDMA communication system of claim 24, wherein the portable electronic device is further operative to set and run a timer corresponding to a fade timer of the base station, and cause the transmitter to exit the low power state in response to detecting an expiration of the timer prior to release of the voice or the data call by the base station.

29. A method for use in reducing power consumption in a battery-operable mobile station which operates in accordance with code division multiple access (CDMA) communications, the method comprising the acts of:

maintaining a voice or a data call during which information is communicated over forward and reverse traffic channels setup with a serving base station;

based on identifying that there is no information to transmit from a transmitter of the mobile station: powering down a transmitter power amplifier (PA) during a portion of the voice or the data call such that no signals are transmitted from the transmitter to the serving base station during the portion of the voice or the data call, and setting and running a timer corresponding to a fade timer of the base station;

powering up the transmitter PA in response to detecting transmit activity for the voice or the data call prior to expiration of the timer for resuming communications for the voice or the data call; and otherwise powering up the transmitter PA in response to detecting an expiration of the timer and before a release of the reverse traffic channel by the serving base station for resuming communications for the voice or the data call.

30. The method of claim 29, further comprising:
while the transmitter PA is powered down during the portion of the voice or the data call, receiving one or more power values from the serving base station and storing one or more transmitter power values based thereon.

31. The method of claim 29, further comprising:
while the transmitter PA is powered down during the portion of the voice or the data call, receiving one or more power values from the serving base station for tracking an open loop transmit power required when transmission for the voice or the data call is resumed, and storing one or more transmitter power values based thereon.

32. The method of claim 29, wherein communications are based on an IS-95, IS-2000, or CDMA2000 standard.

33. The method of claim 29, wherein the act of identifying that there is no voice or user information to transmit comprises the further act of identifying that there is no signalling information to transmit.

34. The method of claim 29, further comprising:
refraining from transmitting any idle frames while the transmitter PA is powered down during the portion of the voice or the data call.

35. The method of claim 29, further comprising:
prior to powering down the transmitter PA, delaying to reach power control loop stability.

36. The method of claim 29, wherein the act of powering down the transmitter PA comprises imitating a fade to the base station during the portion of the voice or the data call.

37. A code division multiple access (CDMA) mobile station, comprising:
a CDMA receiver;
a CDMA transmitter;
a processor coupled to the CDMA receiver and transmitter:
the processor being operative to:
maintain the CDMA receiver and transmitter in a voice or a data call during which information is communicated over forward and reverse traffic channels setup with a serving base station;
shut down a power amplifier (PA) of the CDMA transmitter during a portion of the voice or the data call, while at least the reverse traffic channel is maintained by the serving base station, based on identifying that there is no information to transmit from the CDMA transmitter;
set and run a timer corresponding to a fade timer of the serving base station;
power up the PA in response to detecting transmit activity for the voice or the data call prior to expiration of the timer for resuming communications for the voice or the data call; and
otherwise power up the PA in response to detecting an expiration of the timer and before release of the reverse traffic channel by the serving base station for resuming communications for the voice or the data call.

38. The mobile station of claim 37 wherein the processor is further operative to, while the PA is shut down during the portion of the voice or data call, receive one or more power values through the CDMA receiver and store one or more transmitter power values based thereon for tracking an open loop transmit power required when transmission for the voice or the data call is resumed.

39. The mobile station of claim 37, wherein the processor is further operative to refrain from transmitting any idle frames to the serving base station while the transmitter PA is powered down during the portion of the voice or the data call.

40. The mobile station of claim 37, wherein the processor is further operative to:
while the PA is shut down during the portion of the voice or the data call:
receive one or more power values through the CDMA receiver;
store one or more transmitter power values which are based on the received power values;
while the PA is being powered up:
gradually increase power of the PA during the voice or data call to reach a previously stored transmitter power value.

* * * * *